United States Patent [19]

Honda et al.

[11] Patent Number: 4,931,954
[45] Date of Patent: Jun. 5, 1990

[54] IMAGE STORAGE SYSTEM AND METHOD OF STORING IMAGES SUCH THAT THEY ARE DISPLAYED WITH GRADUALLY INCREASING RESOLUTION

[75] Inventors: Michitaka Honda; Takehiro Ema, both of Tochigi, Japan

[73] Assignee: Kabushiki Kaisha Toshiba, Kawasaki, Japan

[21] Appl. No.: 67,246

[22] Filed: Jun. 29, 1987

[30] Foreign Application Priority Data

Jun. 30, 1986 [JP] Japan .................. 61-151655
Jul. 4, 1986 [JP] Japan .................. 61-156119

[51] Int. Cl.$^5$ .............................................. G06F 3/14
[52] U.S. Cl. ..................... 364/518; 364/521; 340/750; 358/133
[58] Field of Search ............ 364/518, 521; 340/728; 382/47; 358/138, 133

[56] References Cited

U.S. PATENT DOCUMENTS

| | | | |
|---|---|---|---|
| 4,275,450 | 6/1981 | Potter | 364/515 |
| 4,364,090 | 12/1982 | Wendland | 358/140 |
| 4,439,762 | 3/1984 | Van Vliet et al. | 340/750 |
| 4,608,600 | 8/1986 | Sugiyama | 358/138 |
| 4,610,026 | 9/1986 | Tabata et al. | 382/47 |
| 4,630,307 | 12/1986 | Cok | 382/25 |
| 4,633,296 | 12/1986 | Cham et al. | 358/12 |
| 4,642,689 | 2/1987 | Demma | 356/166 |
| 4,646,262 | 2/1987 | Smith | 364/900 |
| 4,660,157 | 4/1987 | Beckwith et al. | 364/522 |
| 4,695,835 | 9/1987 | Bugg | 340/750 |
| 4,739,405 | 11/1988 | Sumida | 358/160 |
| 4,791,486 | 12/1988 | Spriggs et al. | 358/138 |
| 4,797,741 | 1/1989 | Sato et al. | 358/138 |
| 4,802,003 | 1/1989 | Takei et al. | 358/133 |

OTHER PUBLICATIONS

Dill F. H. "High Resolution NTSC Television System" vol. 21 No. 5 IBM Technical Disclosure Bulletin 10/78 pp. 2148-2153.

Primary Examiner—Gary V. Harkcom
Assistant Examiner—Phu K. Nguyen
Attorney, Agent, or Firm—Cushman, Darby & Cushman

[57] ABSTRACT

A series of data access is performed wherein a representative pixel of each divided region obtained by dividing an original image frame into a plurality of regions is sequentially accessed while increasing the number of divisions. The series of data access is repeated for each bit string so that data of each bit string obtained by dividing gradation data of each pixel into a plurality of bit strings are sequentially read out from the upper string to the lower bit string, and the resultant data are sequentially stored in a storage medium. In this manner, image data of a plurality of frames are stored in the storage medium. The image data of a plurality of frames stored in the storage medium are read out in units of predetermined number of data for each image data, and data of pixels which have not yet been read out in each image frame are interpolated and displayed. When all the data of a specific image frame retrieved by the display operation are read out, the original image data can be reproduced and displayed.

14 Claims, 11 Drawing Sheets

| ORDER | $a_{2N-1}$ | $a_{2N-2}$ | $a_{2N-3}$ | ... | $a_4$ | $a_3$ | $a_2$ | $a_1$ | $a_0$ |
|---|---|---|---|---|---|---|---|---|---|
| 0 | 0 | 0 | 0 | | 0 | 0 | 0 | 0 | 0 |
| 1 | 0 | 0 | 0 | | 0 | 0 | 0 | 0 | 1 |
| 2 | 0 | 0 | 0 | | 0 | 0 | 0 | 1 | 0 |
| 3 | 0 | 0 | 0 | | 0 | 0 | 0 | 1 | 1 |
| 4 | 0 | 0 | 0 | | 0 | 0 | 1 | 0 | 0 |
| 5 | 0 | 0 | 0 | | 0 | 0 | 1 | 0 | 1 |
| ... | | | | | | | | | |
| $2^{2N}-3$ | 1 | 1 | 1 | | 1 | 1 | 1 | 0 | 1 |
| $2^{2N}-2$ | 1 | 1 | 1 | | 1 | 1 | 1 | 1 | 0 |
| $2^{2N}-1$ | 1 | 1 | 1 | | 1 | 1 | 1 | 1 | 1 |

| ORDER | $a_0$ | $a_2$ | $a_4$ | ----- | $a_{2N-4}$ | $a_{2N-2}$ |
|---|---|---|---|---|---|---|
| 0 | 0 | 0 | 0 | | 0 | 0 |
| 1 | 1 | 0 | 0 | | 0 | 0 |
| 2 | 0 | 0 | 0 | | 0 | 0 |
| 3 | 1 | 0 | 0 | | 0 | 0 |
| 4 | 0 | 1 | 0 | | 0 | 0 |
| 5 | 1 | 1 | 0 | | 0 | 0 |
| ⋮ | | | | | | |
| $2^{2N}-3$ | 1 | 1 | 1 | | 1 | 1 |
| $2^{2N}-2$ | 0 | 1 | 1 | ----- | 1 | 1 |
| $2^{2N}-1$ | 1 | 1 | 1 | | 1 | 1 |

FIG. 5B

| ORDER | $a_1$ | $a_3$ | $a_5$ | ----- | $a_{2N-3}$ | $a_{2N-1}$ |
|---|---|---|---|---|---|---|
| 0 | 0 | 0 | 0 | | 0 | 0 |
| 1 | 0 | 0 | 0 | | 0 | 0 |
| 2 | 1 | 0 | 0 | | 0 | 0 |
| 3 | 1 | 0 | 0 | | 0 | 0 |
| 4 | 0 | 0 | 0 | | 0 | 0 |
| 5 | 0 | 0 | 0 | | 0 | 0 |
| ⋮ | | | | | | |
| $2^{2N}-3$ | 0 | 1 | 1 | | 1 | 1 |
| $2^{2N}-2$ | 1 | 1 | 1 | ----- | 1 | 1 |
| $2^{2N}-1$ | 1 | 1 | 1 | | 1 | 1 |

IMAGE STORAGE SYSTEM AND METHOD OF STORING IMAGES SUCH THAT THEY ARE DISPLAYED WITH GRADUALLY INCREASING RESOLUTION

BACKGROUND OF THE INVENTION

The present invention relates to an image storage system for storing image data of a $2^N \times 2^N$ matrix size in a storage medium, and reading out the image data therefrom, in order to display it, and, more particularly, to an image storage system which is effective for improving the efficiency of retrieving the image data from the storage medium.

Storage and retention of image data are often necessary. However, when image data which is stored in a storage medium is read out and displayed, as a matrix size of original image data increases, the time required for transferring image data of one frame to be visualized on a display device is prolonged. When, for example, medical image data is read out from a storage medium and is displayed for diagnosis, it may take a long time in a process of image data transfer and visualization, degrading diagnosis efficiency. In particular, recently, image data constituted by gradation data, e.g., gray-scale data for each pixel having a great data length, e.g., about 16 bits, is used. Use of image data consisting of gradation data having a great data length results in a prolongation of the time required for transferring and visualizing an image of one frame. For this reason, when a plurality of frames of image data are stored in a storage medium, a very long time is necessary to retrieve a desired image from the medium and display it.

In order to shorten a time required for transfer/visualization and to improve retrieval efficiency, a data companding technique is employed such that image data is compresssed and is transferred and visualized. In the data companding technique that can be applied to image data, at most 30% data compression can only be performed if compression/expansion (restoration) is performed without losing a data volume of the image data. If data compression at a higher ratio is performed, image data may be partially lost.

As described above, in the data companding technique, an image data compression ratio free from data loss is at most 30%, and a time required for transfer/retrieval can only be shortened accordingly. Therefore, in a conventional system, it is difficult to greatly improve image data transfer efficiency and to greatly shorten a time required for retrieval.

SUMMARY OF THE INVENTION

It is an object of the present invention to provide an image storage system which can reliably retrieve image data having any image matrix size at high speed and high efficiency without losing information of image data that is finally retrieved and used.

In the image storage system of the present invention, a series of data access is performed wherein a representative pixel of each divided region obtained by dividing an original image frame into a plurality of regions is sequentially accessed while increasing the number of divisions. The series of data access is repeated for each bit string so that data of each bit string obtained by dividing gradation data of each pixel into a plurality of bit strings are sequentially read out from the upper bit string to the lower bit string, and the resultant data are sequentially stored in a storage medium. In this manner, image data for a plurality of frames are stored in the storage medium. The image data for a plurality of frames stored in the storage medium are read out in units of predetermined number of data for each image data, and data of pixels which are not yet read out in each image frame are interpolated to be displayed. When all the data of a specific image frame retrieved by the display operation are read out, the original image data can be reproduced and displayed.

The present invention is made based on the following two points.

(1) When image data of one frame is stored, assuming that a matrix size of pixel data corresponds to, e.g., $2^N \times 2^N$, original image data should be completely reproduced regardless of the order of $2^{2N}$ data as long as the storage order is known.

(2) Even if a bit string of gradation data of each pixel is divided and stored, if all the bit strings are stored, image data should be completely reproduced from the stored data.

For this reason, according to the present invention, gradation data constituting a pixel is divided into a plurality of bit strings. A first bit string including the most significant bit is stored in a predetermined order. After all the pixels of the first bit string are stored, gradation data in the following bit strings are sequentially stored in accordance with the predetermined order.

In order to store each bit string, a representative pixel address is generated for each divided region obtained by $2^n$ ($n < N$) dividing an image in horizontal and vertical directions. Subsequently, representative pixel addresses are generated for each of $2^{n+1}$ to $2^N$ divisions while updating n one by one, excluding the previously designated addresses.

More specifically, if $n = 1$, an original image frame is divided by 2 in the horizontal and vertical directions, i.e., into 4 regions, and four points of representative pixels are selected. Then, the original image frame is divided by 4 in the horizontal and vertical directions, i.e., into 16 regions, and 12 points of representative pixels which have not been previously selected are selected. Thereafter, the original image frame is divided into 64 regions, 256 regions, ..., $2^{2N}$ regions, and representative pixels in each divided region which have not been previously selected are selected, and are subjected to transfer/storage.

With this storage operation, image retrieval operation can be quickly and easily performed. More specifically, when first $2^{2k}$ ($k < N$) data of image data stored in the storage medium are read out, an image can be displayed at high speed. In this case, a displayed image consists of data of the first bit strings of the gradation data, and an image matrix is at a low spatial density. However, since a very small number of data are read out, they can be read out at high speed. When the readout and display oeprations are performed for a plurality of image data, a plurality of images can be selectively displayed at high speed, and image retrieval can also be performed at high speed. Note that although the data storage orders are different, since all the data are stored without losing, all the gradation data including the lower bit strings can be read out and displayed for all the pixels in order to obtain an image of high precision. The number of readout data can be appropriately determined in consideration of a retrieval time and accuracy of retrieval.

According to the present invention, the image storage system can be provided wherein an image having any image size can be retrieved at high speed without losing information of image data. A method of storing images in this way is also contemplated.

BRIEF DESCRIPTION OF THE DRAWINGS

FIGS. 5 A to 5C are views for explaining the principle of address generation used in the embodiment;

DETAILED DESCRIPTION OF THE PREFERRED EMBODIMENT

An image storage system according to an embodiment of the present invention will now be described with reference to the accompanying drawings.

Figure 1A:
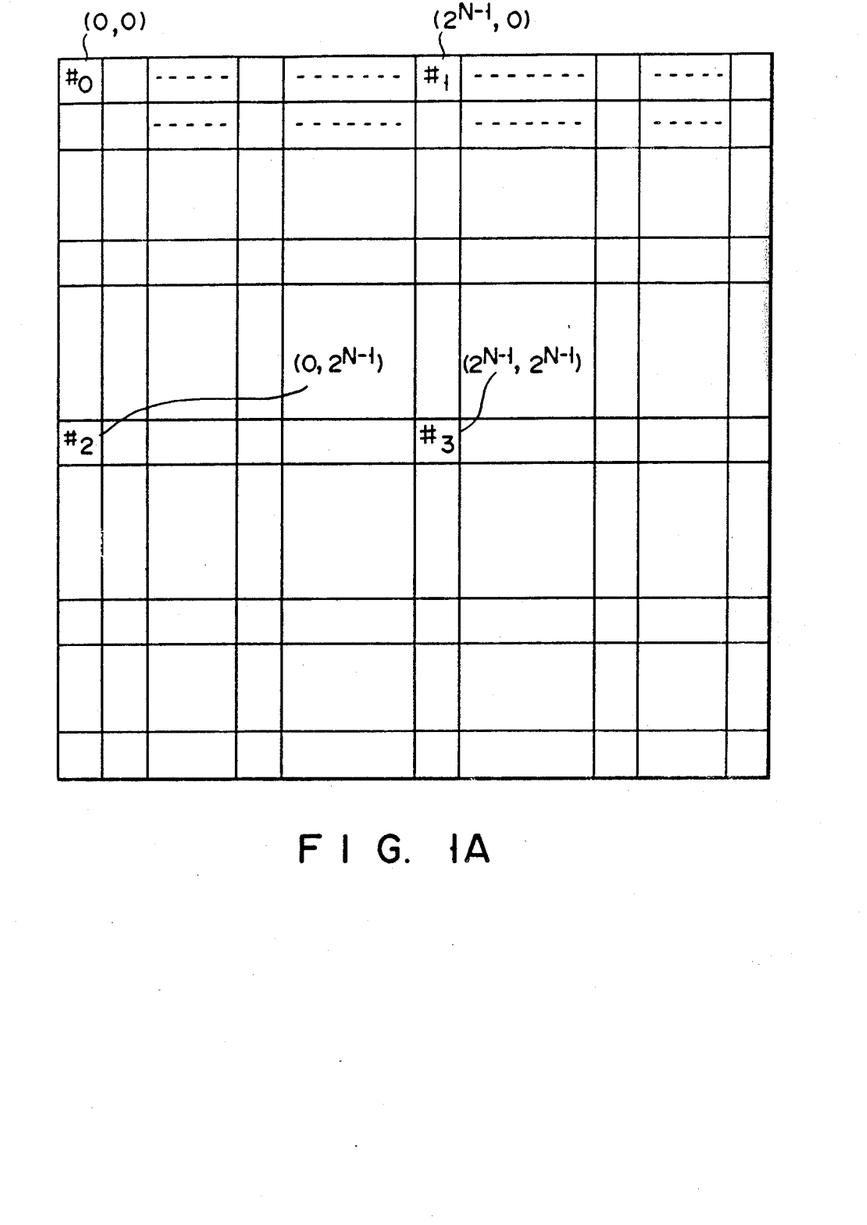
FIGS. 1A to 1C are views for explaining a regional division of an image according to an embodiment of the present invention.
Figure 1B:
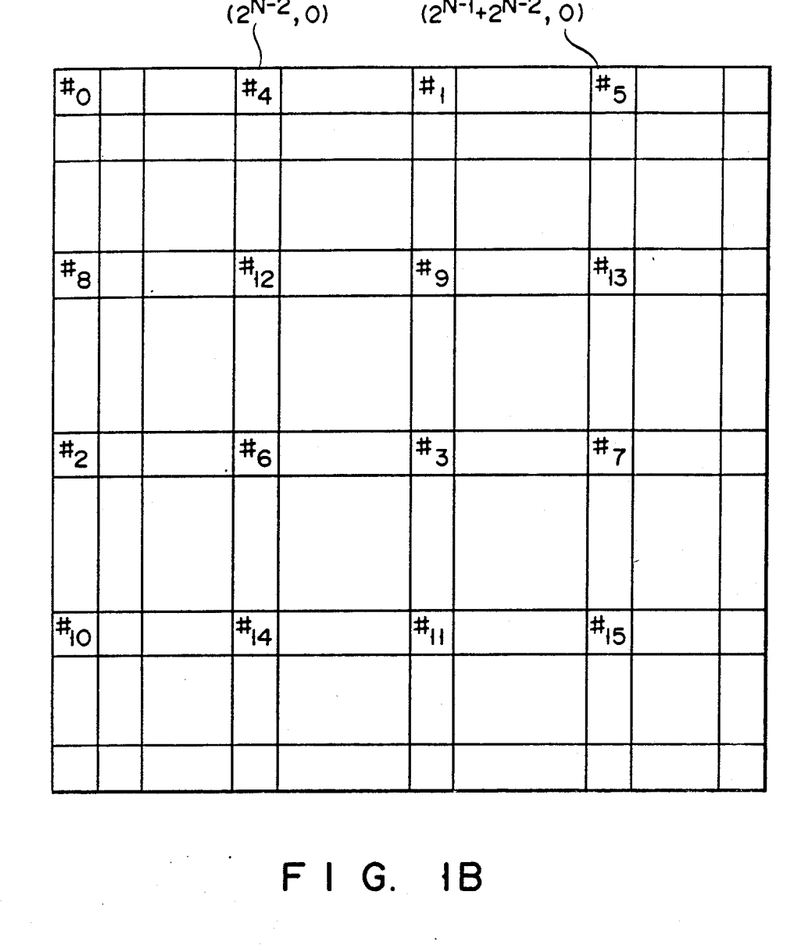
Figure 1C:
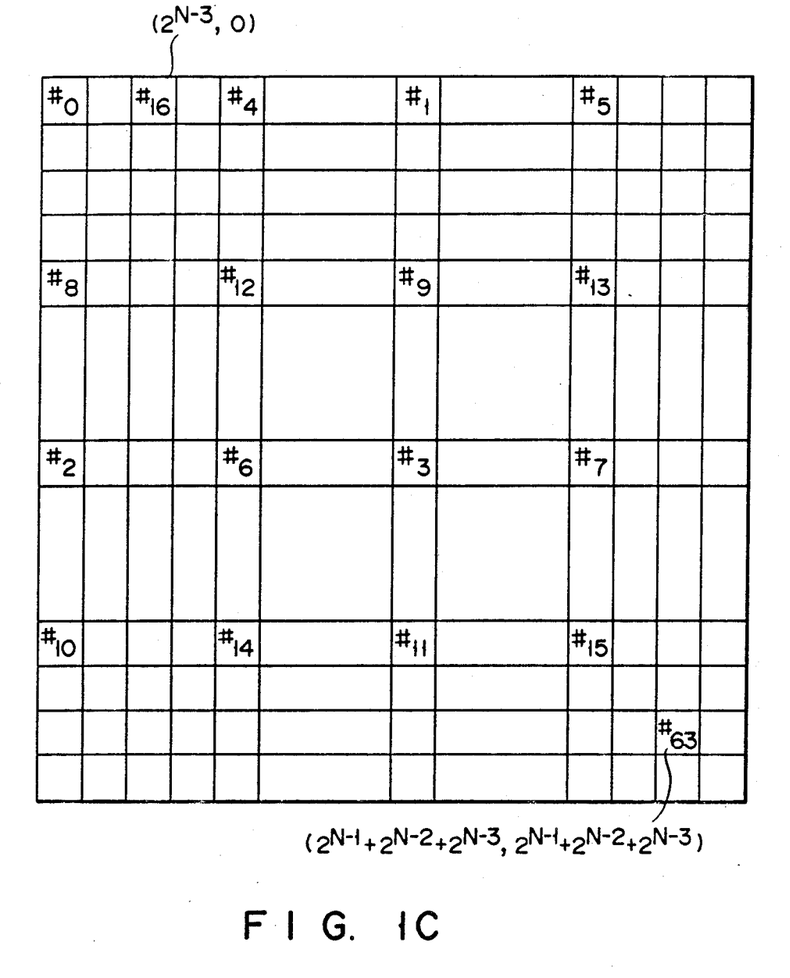
Figure 2:
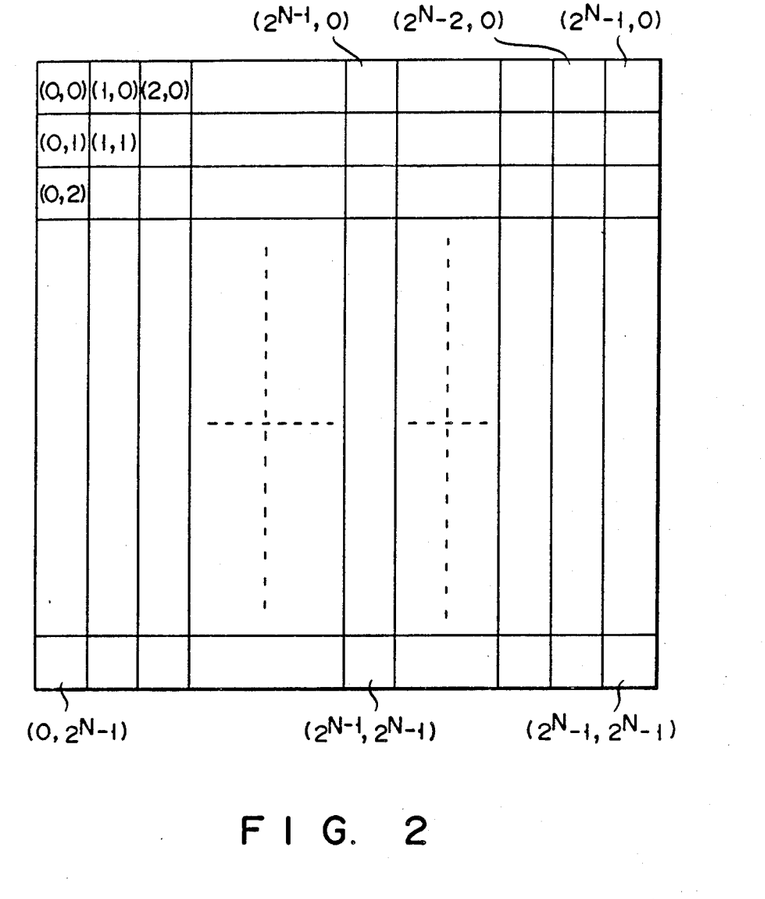
FIG. 2 is a view for explaining a two-dimensional address of image data used in the embodiment.

FIG. 2 shows two-dimensional addresses of image data used in this embodiment. The two-dimensional addresses of the image data are the same as those in a conventional system. That is, horizontal addresses 0 to $2^N-1$ and vertical addresses 0 to $2^N-1$ are simply assigned to $2^N \times 2^N$ pixels consisting of one frame of image data. The image transfer principle of the present invention when image data having the basic addresses is to be transferred to a storage device will now be described with reference to FIGS. 1A to 1C. In image transfer according to the principle of the present invention, gradation data of each pixel is selected in the following order, and is sequentially transferred to a destination storage device.

(1) When an original image frame is divided by 2 in the horizontal and vertical directions, i.e., into 4 regions, predetermined representative pixels in divided regions, i.e., pixels of four upper left points #0 to #3 are selected (FIG. 1A).

(2) When the original image frame is divided by 4 in the horizontal and vertical directions, i.e., into 16 regions, representative pixels in divided regions which have not been selected in item (1), i.e., the remaining 12 points #4 to #15, are selected (FIG. 1B).

(3) When the original image frame is divided into $2^n$ (n=1, 2, ..., N) in the horizontal and vertical directions, representative pixels in divided regions which have not yet been selected, i.e., the remaining $\{2^{2n}-2^{2(n-1)}\}$ pixels, are selected (FIG. 1C).

Figure 3:
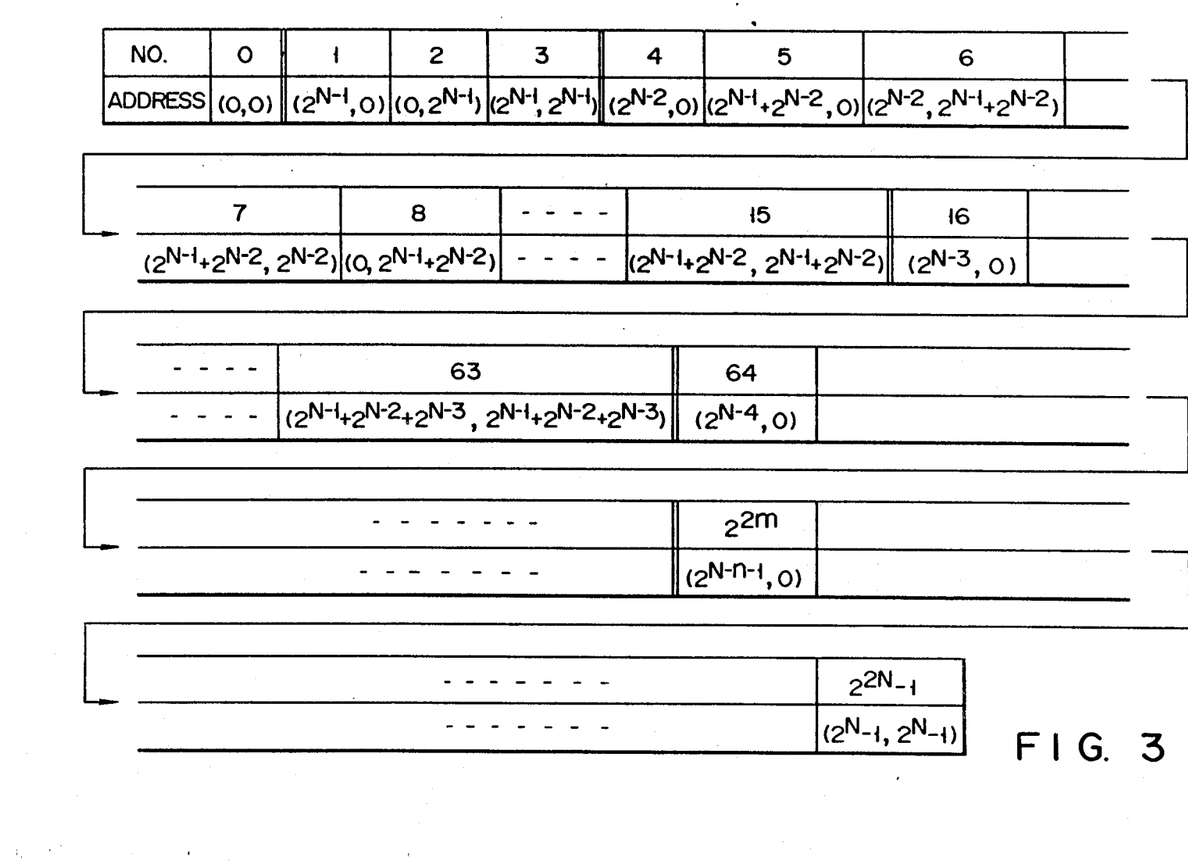
FIG. 3 is a view for explaining an order of image data stored in a storage system in the embodiment.

The image data which are sequentially selected and transferred to be stored in this manner are sequentially written in a storage medium in an order shown in FIG. 3 when they are represented by the pixel addresses shown in FIG. 2. FIG. 3 shows a write order of pixel addresses of image data shown in FIG. 2 in a storage device comprising a one-dimensional storage system.

The data written in this manner have the following features.

(1) If an image is constituted by first 4 image data stored in the storage device, this means that an original image is roughly consituted by 4 pixels, i.e., $2 \times 2$ pixels. This image can also be regarded that an image consisting of $2^N \times 2^N (=2^{2N})$ pixels is compressed to $\frac{1}{2}^2(N-1)$.

(2) If an image is constituted by first 16 image data written in the storage device, this means that an original image is roughly expressed by 16 pixels, i.e., $4 \times 4$ pixels.

(3) If an image is constituted by first $2^{2k}$ image data written in the storage device, this means that an original image is expressed by $2^{2k}$ pixels, i.e., $2^k \times 2^k$ pixels.

(4) If k=N, the original image can be reconstructed without any loss.

A one-dimensional data string shown in FIG. 3 corresponds to a storage format in a storage device such as a magnetic disk device or a magnetic tape device. When image data is stored in accordance with the storage format, k is selected to be smaller than N so as to read out $2^k \times 2^k$ data, thereby constructing an image in a low-density matrix. When a specific image is retrieved from a plurality of stored images, an image with higher precision is not necessary as long as it can be distinguished from other images. Therefore, when k is selected to be a small value to read out images, retrieval can be performed at very high speed. After retrieval, in order to reconstruct all the pixels of the original image to obtain an image of high precision, the remaining data can be added to the retrieved data to construct an image.

When the above-mentioned data transfer and storage are performed, a bit string of gradation data constituting each pixel is divided into a plurality of bit strings, and divided data including the MSB (most significant bit), i.e., data of the first bit strings, are transferred for all the pixels. After the data in the first bit strings are transferred for all the pixels, data of second bit strings which are most significant in the remaining divided data are similarly transferred. This data transfer is repeated to transfer gradation data of all the bits constituting all the pixels. When first $2^{2k}$ data are read out from the storage device which stores the image data transferred and stored in this manner so as to construct an image, an image which is spatially coarse (i.e., the number of constituting pixels is small) and has a low density (i.e., the number of gradation levels is small) is constructed and displayed. When value k and the number of divisions of the gradation data are determined to be enough to provide sufficient precision of a retrieval image, high-speed and effective image retrieval can be realized.

Figure 4:
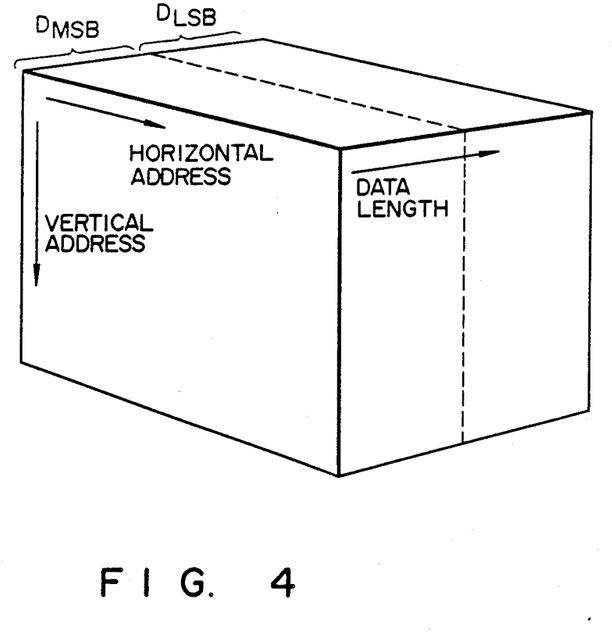
FIG. 4 is a view for explaining a bit division of gradation data of image data.

As a gradation data dividing method, it can be considered that gradation data constituted by, e.g., 16 bits, can be divided by 2, e.g., into 8-bit data corresponding to bit precision of a generally used D/A (digital-to-analog) converter. In this case, an image constituted by gradation data of upper 8 bits (first bit string) has a small number of gradation levels. However, such an image can often be used as a retrieval image. FIG. 4 shows the principle when the gradation data is divided by 2. As shown in FIG. 4, upper or first bit string data (DMSB) of the gradation data are first transferred, and lower or second bit string data (DLSB) are transferred after all the pixels of the DMSB are transferred, thus transferring all the pixels.

When an image is retrieved, only the upper 8-bit data of image data, i.e., DMSB, are read out to construct respective images, and the constructed images are sequentially displayed. When the retrieved image is to be displayed with high precision, after all the pixels of the upper 8-bit data are constructed, the lower 8-bit data are read, so that the image can be constructed by the 16-bit data.

Image Storage/Read Address Generator

The image data read/write order with respect to the storage device has been described above. Addresses must be provided in a normal order to a two-dimensional memory which stores data before write access and/or readout data. The method will be described below.

In order to access all the pixels of the $2^N \times 2^N$ image, addressing must be detemined while each address is incremented from 0 until $2^N \times 2^N - 1$. This can be realized by a conventional counter. Horizontal and vertical addressess are extracted and generated from bits constituting data indicating the addressing order (a total of $2 \cdot N$ bits) as follows.

Figure 5A:
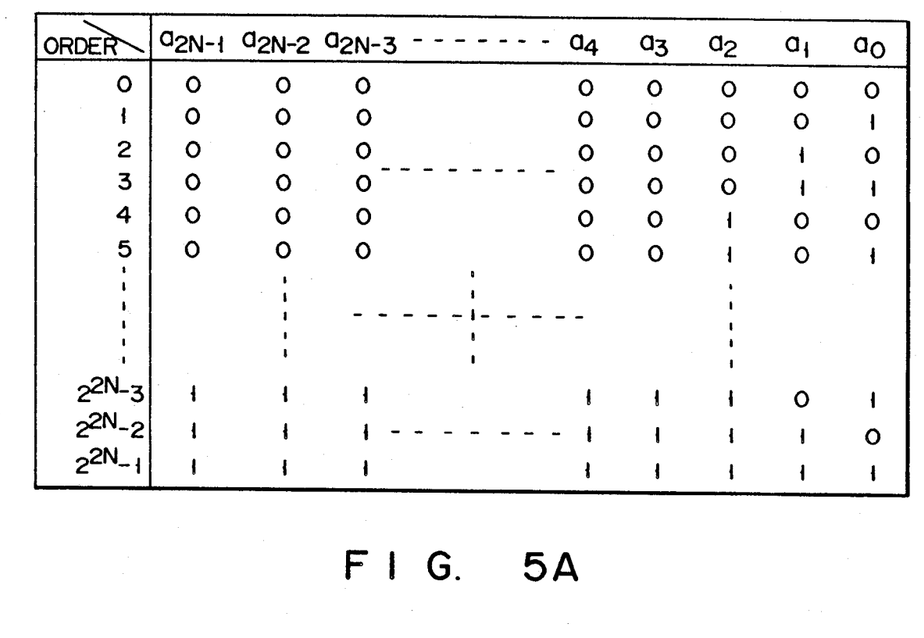

(1) As shown in FIG. 5A, bit numbers from the MSB to the LSB (least significant bit) of $2 \cdot N$-bit data obtained from the counter are respectively given as $a_{2N-1}$, $a_{2N-2}$, ..., $a_2$, $a_1$, and $a_0$.

Figure 5B:
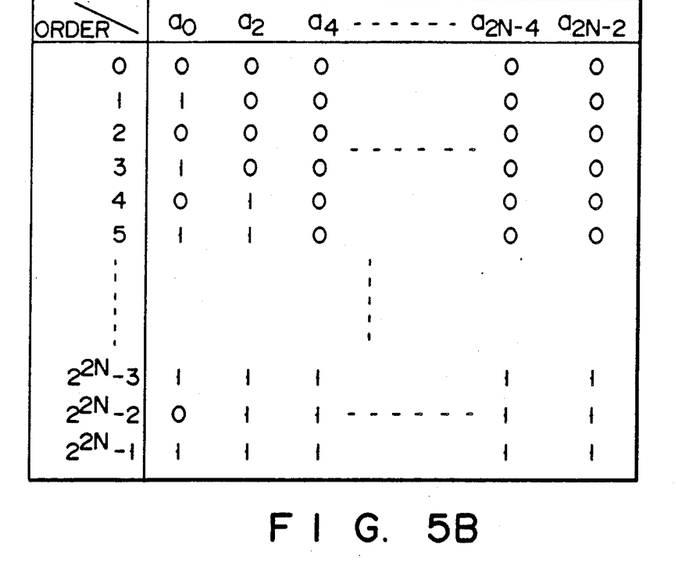

(2) As shown in FIG. 5B, bits of bit numbers $a_{2N-2}$, ..., $a_4$, $a_2$, and $a_0$ are extracted from the data shown in FIG. 5A, and the bit order is inverted, so that $a_0$, $a_2$, $a_4$, ..., $a_{2N-2}$ are determined as horizontal addresses is the MSB and $a_{2N-2}$ is the LSB).

Figure 5C:
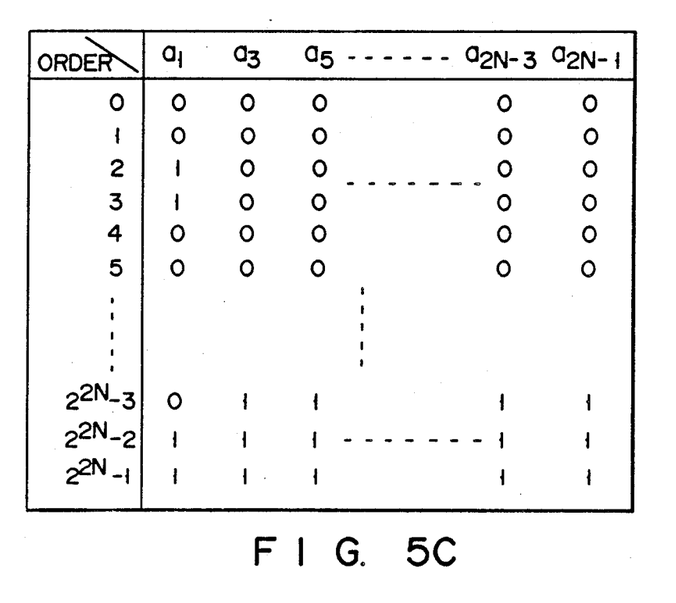

(3) As shown in FIG. 5C, bits of bit numbers $a_{2N-1}$, ..., $a_5$, $a_3$, and $a_1$ are extracted from the data shown in FIG. 5A, and the bit order is inverted, so that $a_1$, $a_3$, $a_5$, ..., $a_{2N-1}$ are determined as vertical addresses ($a_1$ is the MSB and $a_{2N-1}$ is the LSB).

More specifically, as shown in FIGS. 5A to 5C, the horizontal and vertical addresses respectively have bit configurations whose orders are reversed to that of the bit configuration of output data from the counter and each of which is constituted by bits extracted at every other bit. The storage medium storing original images is accessed in accordance with a count order using the above horizontal and vertical addresses so as to read out original image data therefrom and to transfer the readout data to the storage device. Thus, the data can be stored in the storage device in the order described above.

Figure 6:
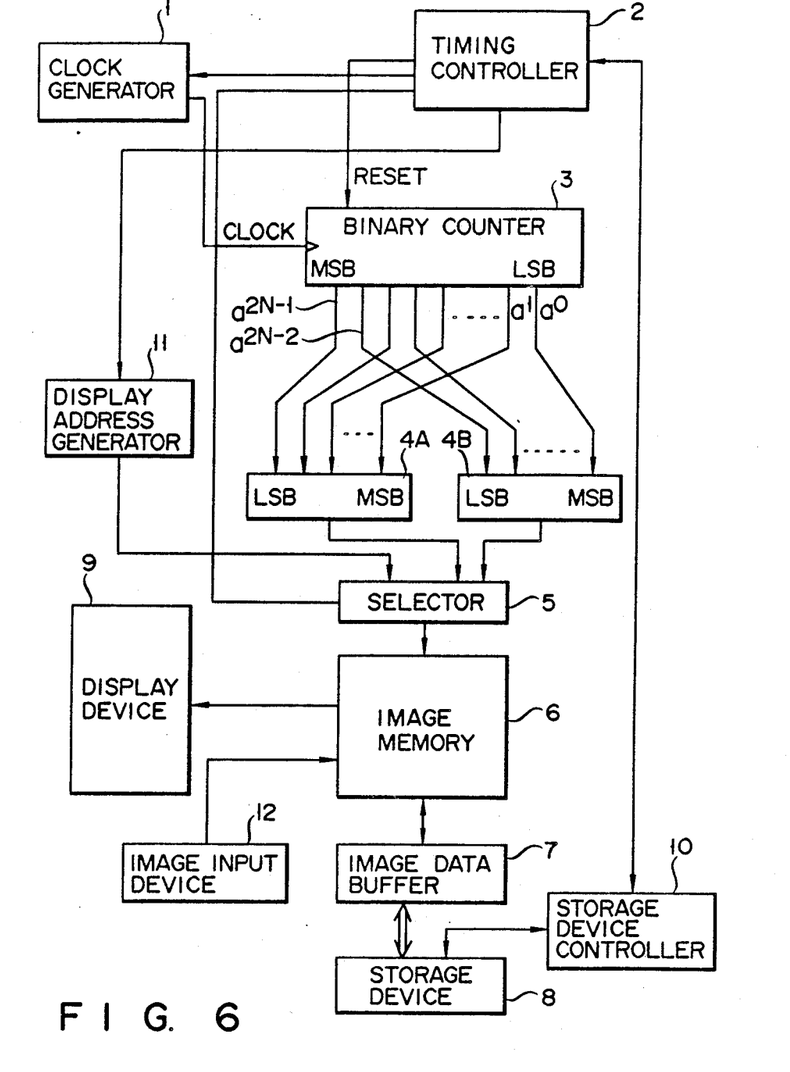
FIG. 6 is a block diagram showing the arrangement of an image storage system according to the embodiment.

An address generator will now be described with reference to FIG. 6 showing the arrangement of the image storage system according to the embodiment of the present invention.

Referring to FIG. 6, original image data supplied from image input device 12 is stored in image memory 6. Under the control of storage device controller 10, the image is then transferred from memory 6 to storage device 8 through image data buffer 7 in accordance with the above-mentioned transfer and storage methods, and is stored therein. A plurality of image data can be stored in storage device 8 in the storage format according to the method of the present invention. The image data stored in device 8 is transferred to image memory 6 through image data buffer 7 under the control of controller 10, and is then subjected to a display operation. An identical address generator can be used for image data read access from image memory 6 upon writing data into device 8 and write access of image data into memory 6 upon retrieval and display from device 8. This address generator comprises clock generator 1, binary counter 3, and address buffers 4A and 4B. A count clock signal for counter 3 is supplied from clock generator 1, to provide an address update timing for image memory 6. Counter 3 is reset in synchronism with an image transfer start or image display switching timing under the control of timing controller 2. The binary outputs from counter 3 are alternately extracted at every other bit and their bit positions are reversed to have an order of MSB→LSB. Then, the outputs from counter 3 are supplied to horizontal and vertical address buffers 4A and 4B. When image data is transferred from image memory 6 to storage device 8, selector 5 selects the output from address buffers 4A and 4B and supplies the selected output to image memory 6 as a read address. When image data is transferred from storage device 8 to image memory 6, selector 5 selects the outputs from buffers 4A and 4B and sends the selected output to image memory 6 as a write address. Data communication between image memory 6 and storage device 8 is performed through data buffer 7.

The representative address for the upper left one of the divided regions can be easily generated by alternately extracting the output bits from binary counter 3 in the reversed order. The representative address can be generated by a simple, inexpensive arrangement, and no complicated arithmetic operation and data processing are required. Note that if the addresses shown in FIG. 5B are used as vertical addresses and the addresses shown in FIG. 5C are used as horizontal addresses, only the designating orders of the representative addresses for each number of region divisions are different, and the representative addresses for the upper left one of divided regions can be sequentially generated.

When the content of image memory 6 is to be displayed, selector 5 selects the output from display address generator 11 (to be described later), and sequentially supplies display read address data to image memory 6. Data read out from image memory 6 is supplied to display 9 using a CRT (cathode-ray tube) and is displayed thereon.

Controller for Controlling Number of Readout Data upon Retrieval

When image data is written in storage device 8 by the above-mentioned address generation and data division, the number of readout data is set to be $2^k \times 2^k$ ($k < N$), so that the number of readout data is decreased, i.e., a data readout time is shortened, and an image to be retrieved can be displayed at high speed. The number of readout data is controlled by timing controller 2.

Figure 7:
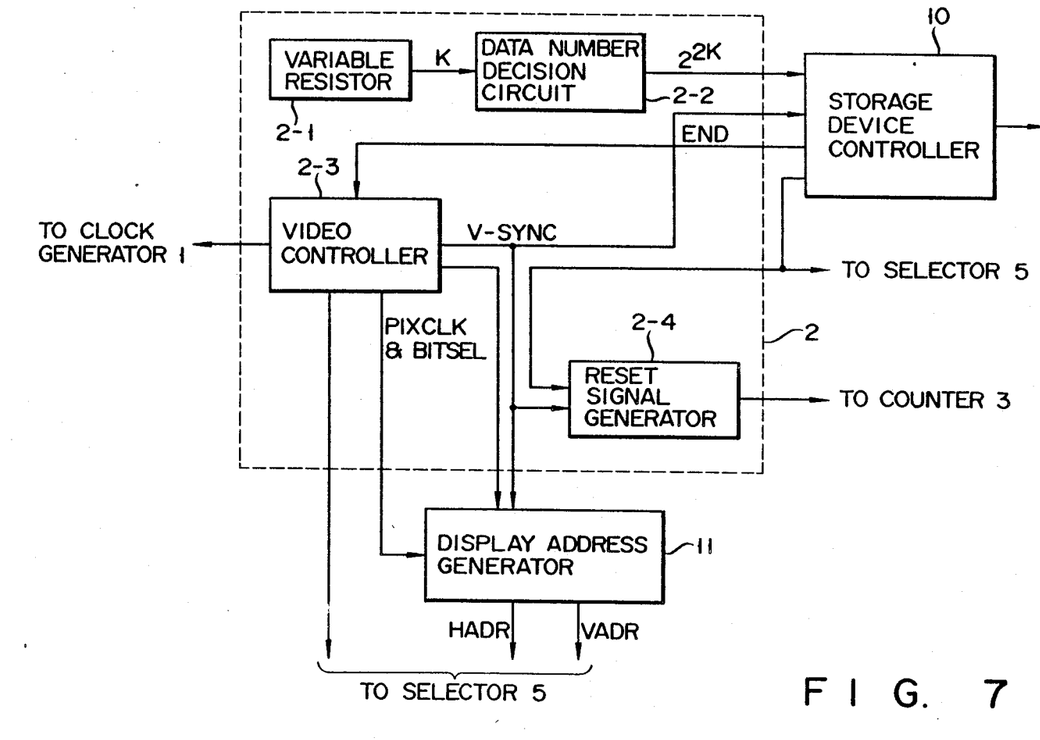
FIG. 7 is a block diagram showing in detail a part of FIG. 6.

Timing controller 2 shown in FIG. 6 has a function for controlling the number of data upon reading. FIG. 7 shows the detailed arrangement of timing controller 2.

In the arrangement shown in FIG. 7, the number of readout data is set by variable resistor 2-1 and data number decision circuit 2-2.

A voltage signal corresponding to a resistance of variable resistor 2-1 for adjusting a retrieval speed determines k of the number $2^{2k}$ of data for each image data read out from storage device 8. For example, if a voltage signal output from variable resistor 2-1 has a large value, k is selected to be large, and a retrieved image is displayed with high precision. When the number of readout data is determined by data number decision circuit 2-2, storage device controller 10 sends a readout start signal so as to initiate reading of image data stored in storage device 8 from the beginning. The decided number of data read out from storage device 8 is written in image memory 6 in accordance with the above-mentioned write address. After data is written in image memory 6, the data readout operation from image memory 6 is started in accordance with the display address generated by display address generator 11 in response to a vertical sync signal for the display operation of display 9 (output from video controller 2-3 to be described later) which is supplied after data storage is completed.

The display controller will now be described in more detail with reference to FIG. 7. A voltage signal obtained from variable resistor 2-1 which can be operated by an operator is supplied to data number decision circuit 2-2, and the number $2^{2k}$ of readout data for each image data is decided in accordance with the voltage level. The decided number of data is supplied to storage device controller 10, and the number of readout data for each image data of storage device 8 is decided. The readout start timing of storage device 8 is determined in accordance with video vertical sync signal V-SYNC output from video controller 2-3. After the preset number of data transfer from storage device 8 to image memory 6 is completed, controller 10 sends end signal END to video controller 2-3. Generator 11 uses video vertical sync signal V-SYNC output from video controller 2-3 as a reset signal and display clock signal PIXCLK in unites of pixels as a count clock signal, and generates display horizontal and vertical addresses. Display horizontal and vertical addresses HADR and VADR are supplied to image memory 6.

Selector 5 shown in FIG. 6 is adopted to select whether the address supplied to image memory 6 is used for data transfer between memory 6 and storage device 8 or for display. A select signal from selector 5 is output so that a display address is selected in synchronism with the vertical sync signal immediately after transfer end signal END is input to video controller 2-3. When the data transfer to display 9 is completed within a scanning period for one frame, selector 5 is switched in response to a select signal supplied from video controller 2-3 so as to read out the next image data from storage device 8, and selects address data as readout addresses for storage device 8 supplied from binary counter 3 through buffers 4A and 4B. A reset signal for binary counter 3 is generated by reset signal generator 2-4 in response to vertical sync signal V-SYNC. The reset signal is generated in synchronism with the vertical sync signal immediately after image memory 6 is initialized upon completion of transfer of all the contents of image memory 6 to display 9.

When two image memories 6 are prepared and are alternately used as a double buffer (i.e., one memory is used for write access while the other memory is used for read access), a transfer time with respect to the display can be shortened. In this case, a distributor is provided in place of selector 5, and write address for read access from storage device 8 and a display address for data transfer to display 9 can be alternately supplied to the two image memories.

Storage device controller 10 has a function in which immediately after the given number of data for certain image data is read out, data access jumps to the start of the next image data.

When image data supplied from image input device 12 is transferred to storage device 8 and stored therein, a signal indicating transfer start is supplied from controller 10 to reset signal generator 2-4 and selector 5. Thus, binary counter 3 is reset, and outputs from buffers 4A and 4B are selected by selector 5.

Data Interpolation Display Address Generator

When $2^{2k}$ data are sequentially read out from storage device 8 so as to construct an image, image data transferred to image memory 6 have a low spatial density. Therefore, a spatial interpolation circuit is necessary for storing such image data in a display memory normally arranged in display 9. For example, when 64×64 data (i.e., original image is divided into 64×64 data) to construct an image, and the constructed image is written in a display memory having a 512×512 size, the constructed image data must be expanded (interpolated) 8 times in the horizontal and vertical directions.

This interpolation can be easily performed as follows.

After $2^{2k}$ data read out from storage device 9 are stored in image memory 6, the diaplay address data output from display address generator 11 is supplied to image memory 6 under the control of timing controller 2. Generator 11 sequentially outputs $2^k$ addresses in the horizontal directions and $2^k$ addresses in the vertical direction in synchronism with the scanning signal of display 9. However, data is written on a horizontal line in image memory 6 every $2^{N-k}$ data from 0. Thus, k bits from the MSB of N bits of the horizontal address are supplied to image memory 6, and remaining (N−k) bits are set to be "0" so as to be used as the effective horizontal address of image memory 6. This also applies to the vertical address.

When the effective addresses are supplied, data of pixels which are not read from storage device 8 (to be referred to as lost data) are replaced with data of pixels (corresponding to the representative address of the divided region to which the lost data belongs) which are adjacent to the lost data and actually read. Strictly, the actually read $2^{2k}$ data are repetitively read ($2^{N-k}$ data in both the horizontal and vertical directions), thereby interpolating the lost data.

Figure 8:
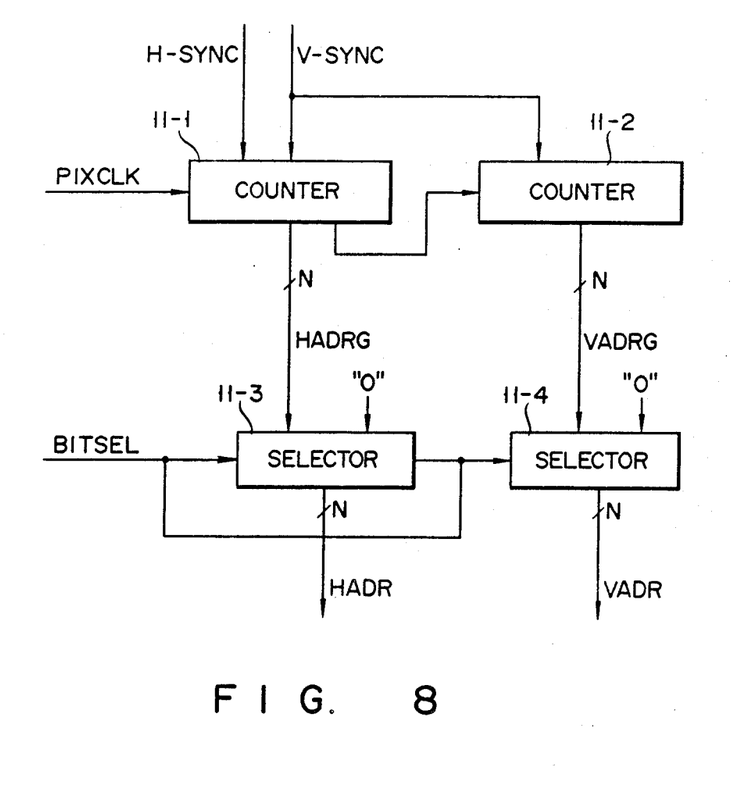
FIG. 8 is a block diagram showing in more detail a part of FIG. 7.

FIG. 8 shows the detailed arrangement of the effective display address generator.

The circuit shown in FIG. 8 is the more detailed arrangement of display address generator 11 shown in FIG. 7. The outputs from horizontal and vertical address counters 11-1 and 11-2 are respectively supplied to horizontal and vertical address bit selectors 11-3 and 11-4. Horizontal and vertical address bit selectors 11-3 and 11-4 select upper k bits and replace the remaining lower (N−k) bits with "0". Selectors 11-3 and 11-4 supply the selected bits and "0" bits to image memory 6 as addresses HADR and VADR. Select signal BITSEL for controlling selectors 11-3 and 11-4 is supplied from video controller 2-3 shown in FIG. 7. Selector signal BITSEL can only provide k for number $2^{2k}$ of data to be written in image memory 6. Therefore, signal BITSEL may be supplied not from video controller 2-3 but from data number decision circuit 2-2.

In the interpolating operation with the above arrangement, data can be transferred to display 9 while interpolating data only by controlling the address data without performing any arithmetic operation of data.

The present invention is not limited to the above arrangement, and various changes and modifications may be made within the spirit and scope of the invention.

For example, image memory 6 shown in FIG. 6 can be divided into two memories, so that the divided memories can be separately used for write registration of image data and read retrieval of image data.

A storage device is not limited to a magnetic tape device and a magnetic disk device, but may be any other storage device such as an optical disk device.

What is claimed is:

1. An image storage and display system comprising:

first storage means, for storing original image data, including gradation data having a predetermined data length, for each of $2^N \times 2^N$ pixels of an image;

address generating means for sequentially generating addresses of representative pixels which are selected from among pixels in each of a plurality of divided regions resulting from dividing an image frame of the original image data stored in said first storage means, by $2^n$ ($n<N$), in the horizontal and vertical directions, and for sequentially generating addresses of other representative pixels, which are addresses of pixels other than pixels whose addresses have already been generated by said address generating means, in said divided regions while incrementing the value of n to further divide the image frame by $2^{n+1}$ to $2^N$;

readout means for reading out image data from said first storage means, in units of bit strings, in accordance with an address generated by said address generating means, the bit strings being obtained by dividing said gradation data of each pixel of the original image data stored in said first storage means in units of the predetermined data lengths, and the bit strings being ordered from an upper data string to a lower data string;

second storage means, for one-dimensionally storing image data of a plurality of frames;

transfer means for sequentially transferring the data, read out by said readout means, to said second storage means; and image reproduction means for reading out and displaying the image data stored in said second storage means.

2. A system according to claim 1, wherein said address generating means comprises binary counter means for generating a binary output including a plurality of bits corresponding to an address generating order, and address extracting means for extracting alternate ones of said bits from the binary output from said binary counter means, and for obtaining horizontal and vertical addresses by reversing an order of the bit output.

3. A system according to claim 1, wherein said image reproduction means comprises data number-setting means for setting a number of data to be retrieved for each image data upon retrieval, selective readout means for selectively reading out a preset number of data from said second storage means for each said image data, in accordance with the number set according to said data number-setting means, and image display means for displaying an image using the image data read out by said selective readout means.

4. A system according to claim 1, wherein said image reproduction means comprises third storage means, for temporarily storing the image data read out from said second storage means, read/write means for sequentially reading out some of the image data stored in said second storage means and storing the readout data in said third storage means, in accordance with the address generated by said address generating means, display means for displaying a reproduced image, interpolation address generating means for generating a read address for accessing said third storage means, by replacing predetermined lower bits to be "0" of the $2^N \times 2^N$ address signals corresponding to display pixels of said image display means, and interpolation transfer means for reading out the data stored in said third storage means, in accordance with the address generated by said interpolation address generating means, and supplying the readout data to said display 5. An image storage and display system comprising:

first storage means, for storing original image data including gradation data having a predetermined bit length, for each of $2^N \times 2^N$ pixels of an image;

binary counter means for generating a binary output including a plurality of bits corresponding to an address generating order;

address extracting means for extracting alternate bits from the binary output from said binary counter means and reversing a bit output order to generate horizontal and vertical addresses in a way to generate addresses of representative pixels selected from among pixels in each divided region resulting from dividing an image frame of the original image data stored in said first storage means, by $2^n$ ($n<N$), in the horizontal and vertical directions, and for sequentially generating addresses of other representative pixels, which are addresses of pixels other than pixels whose addresses have already been generated, in divided regions formed when incrementing the value of n, to divide the image frame by $2^{n+1}$ to $2^N$;

second storage means, for one-dimensionally storing image date of a plurality of frames;

readout means for reading out image data from said first storage means, in accordance with the addresses generated by said address generating means;

transfer means for sequentially transferring the data read out by said readout means, to said second storage means, and storing the readout data therein; and image reproduction means for reading out and displaying the image data stored in said second storage means.

6. A system according to claim 5, wherein said image reproduction means comprises third storage means, for temporarily storing the image data read out from said second storage means, read/write means for sequentially reading out some of the image data stored in said second storage means, and storing the readout data in said third storage means, in accordance with the address generated by said address generating means, display means for displaying a reproduced image, interpolation address generating means for generating a read address for accessing said third storage means by replacing predetermined lower bits to be "0" of the $2^N \times 2^N$ address signals corresponding to display pixels of said image display means, and interpolation transfer means for reading out the data stored in said third storage means, in accordance with the address generated by said interpolation address generating means, and supplying the readout data to said display means.

7. An image storage and display system comprising:

first storage means, for storing original image data including gradation data having a predetermined bit length, for each of $2^N \times 2^N$ pixels of an image;

address generating means for sequentially generating addresses of representative pixels which are selected from among pixels in each of a plurality of divided regions resulting from dividing an image frame of the original image data stored in said first storage means by $2^N$ ($n<N$), in the horizontal and vertical direction, and for sequentially generating addresses of other representative pixels, which are addresses of pixels other than pixels whose addresses have already been generated by said address generating means, in said divided regions while incrementing the value of n, to divide the image frame by $2^{n+1}$ to $2^N$;

readout means for reading out image data from said first storage means, in units of bit strings, in accordance with an address generated by said address generating means, the bit strings being obtained by dividing said gradation data of each pixel of the original image data stored in said first storage means in units of the predetermined data lengths, and the bit strings being ordered from an upper data string to a lower data string;

second storage means, for one-dimensionally storing image data of a plurality of frames;

transfer means for sequentially transferring the data read out by said readout means to said second storage means;

data number-setting means for setting a number of data to be retrieved for each image data upon retrieval;

selective readout means for selectively reading out a number of data for each image data from said second storage means in accordance with the number set by said data number-setting means; and image display means for displaying an image using the image data read out by said selective readout means.

8. A system according to claim 7, wherein said address generating means comprises binary counter means for generating a binary output including a number of bits corresponding to an address generating order, and address extracting means for extracting alternate bits from the binary output from said binary counter means, and obtaining horizontal and vertical addresses by reversing the bit output order.

9. A system according to claim 7, wherein said image reproducing means comprises third storage means for temporarily storing the image data read out from said second storage means, read/write means for sequentially reading out some of the image data stored in said second storage means, and storing the readout data in said third storage means, in accordance with the address generated by said address generating means, display means for displaying a reproduced image, interpolation address generating means for generating a read address for accessing said third storage means, by replacing predetermined lower bits to be "0" of the $2^N \times 2^N$ address signals corresponding to display pixels of said image display means, and interpolation transfer means for reading out the data stored in said third storage means, in accordance with the address generated by said interpolation address generating means and supplying the readout data to said display means.

10. An image storage and display system comprising:
first storage means, for storing original image data including gradation data having a predetermined data length, for each of $2^N \times 2^N$ pixels;
address generating means for sequentially generating addresses of representative pixels which are selected from among pixels in each of a plurality of divided regions resulting from dividing an image frame of the original image data stored in said first storage means, by $2^n$ (n<N), in the horizontal and vertical directions, and for sequentially generating addresses of representative pixels, which are addresses of pixels other than pixels whose addresses have already been generated by said address generating means, in said divided regions while incrementing the value of n, to divide the image frame by $2^{n+1}$ to $2^N$;

readout means for reading out image data from said first storage means, in units of bit strings, in accordance with an address generated by said address generating means, the bit strings being obtained by dividing gradation data of each pixel of the original image data stored in said first storage means in units of the predetermined data lengths, and the bit strings being ordered from an upper data string to a lower data string;

second storage means, for one-dimensionally storing image data of a plurality of frames;

transfer means for sequentially transferring the data read out by said readout means to said second storage means;

third storage means for temporarily storing the image data read out from said second storage means;

read/write means for sequentially reading out some of the image data stored in said second storage means, and storing the readout data in said third storage means, in accordance with the address generated by said address generating means;

image display means for displaying an image to be reproduced;

interpolation address generating means for generating a read address for accessing said third storage means, by replacing predetermined lower bits to be "0" of the $2^N \times 2^N$ address signals corresponding to display pixels of said image display means; and interpolation transfer means for reading out the data stored in said third storage means, in accordance with the address generated by said interpolation address generating means, and supply the readout data to said display means.

11. An image storage system, comprising:
means for receiving information indicative of an image of $2^N \times 2^N$ pixels;
address generating means, for:
(1) setting an initial value of n as a value less than N;
(2) determining a division of a frame of said image, by dividing by $2^n$ in horizontal and vertical directions;
(3) determining representative pixels in each said division;
(4) determining if any of said representative pixels for said each division are the same pixels as representative pixels for a different division which has already been determined;
(5) generating addresses of said representative pixels other than said same representative pixels; and
(6) determining if n<N and incrementing n and repeating said functions (2)-(6) if so, to thereby sequentially divide said image by $2^{(initial\ value\ of\ n)}$ to $2^N$; and storage means for sequentially storing said representative pixels as addresses thereof are generated by said address generating means.

12. A system as in claim 11, further comprising means for sequentially reading said pixels from said storage means and displaying said pixels in an order of said sequential reading.

13. A method for storing an image in a storage system, comprising the steps of:

(1) receiving information indicative of an image of $2^N \times 2^N$ pixels;

(2) setting an initial value of n as a value less than N;

(3) determining a division of a frame of said image, by dividing by $2^n$ in horizontal and vertical directions;

(4) determining a representative pixel in each said division;

(5) determining if any of said representative pixels for said each division are the same pixels as representative pixels for a different division, which have already been determined;

(6) generating addresses of said representative pixels other than said same representative pixels; and (7) determining if n<N and incrementing n and repeating said functions (3)–(7) if n<N, to thereby sequentially divide said image by $2^{(initial\ value\ of\ n)}$ to $2^N$; and (8) storing said representative pixels as addresses thereof are generated.

14. A method as in claim 13, further comprising the step of sequentially reading said pixels from said storage means and displaying said pixels in an order of said sequentially reading.

* * * * *